Sept. 10, 1963   F. KRÜGER ETAL   3,103,429
APPARATUS FOR THE PRODUCTION OF WELDED DOUBLE GLASS SHEETS
Filed Aug. 6, 1959   4 Sheets-Sheet 1
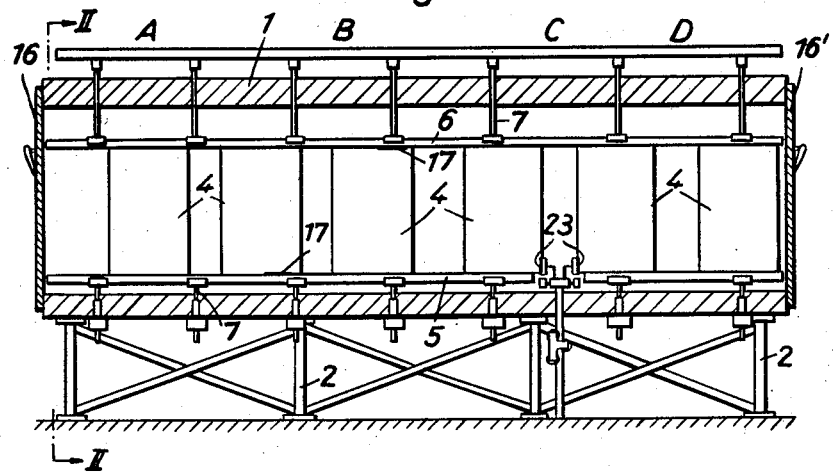
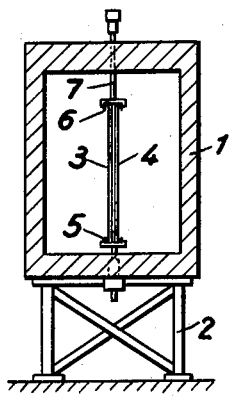
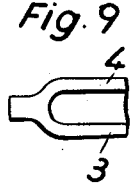
INVENTORS
Fritz Krüger, Franz Mainz
BY and Günther Rodloff
Nobbe & Swope
ATTORNEYS

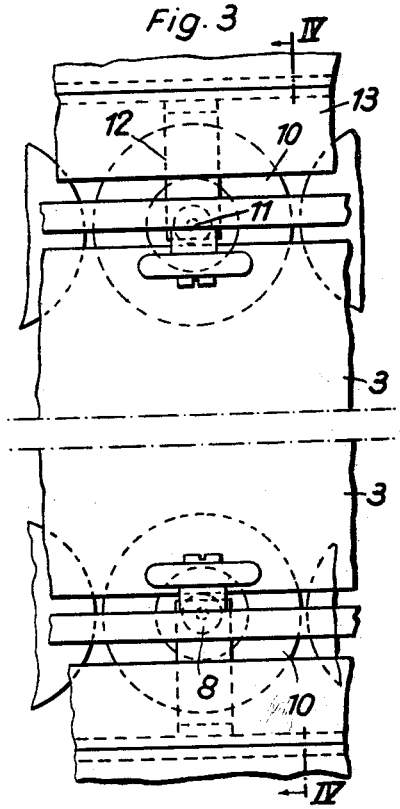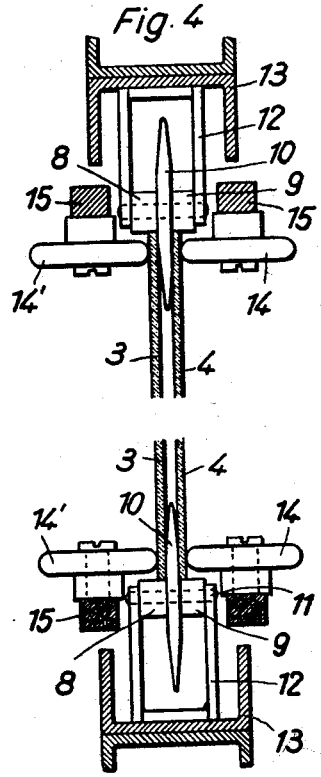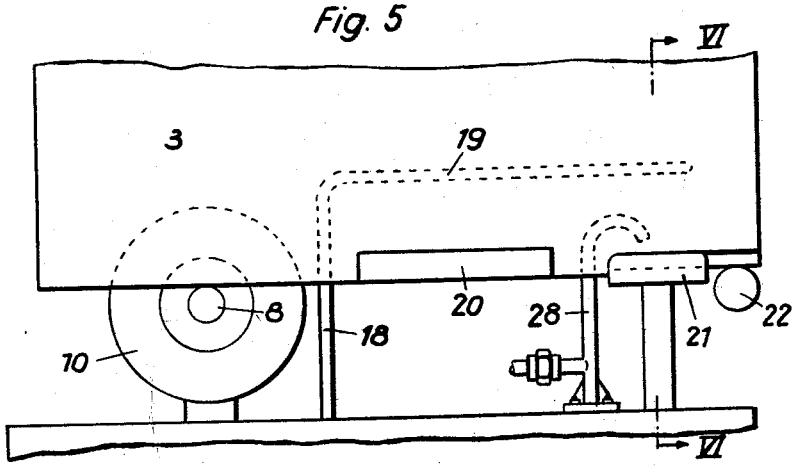

Sept. 10, 1963  F. KRÜGER ETAL  3,103,429
APPARATUS FOR THE PRODUCTION OF WELDED DOUBLE GLASS SHEETS
Filed Aug. 6, 1959
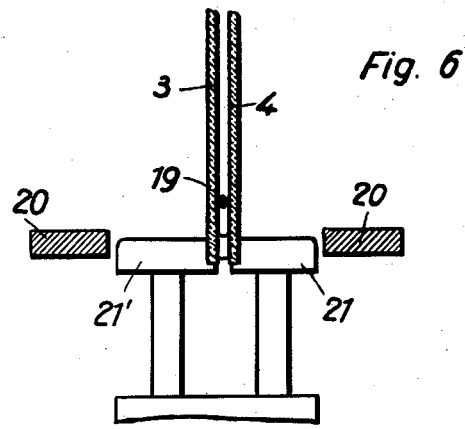
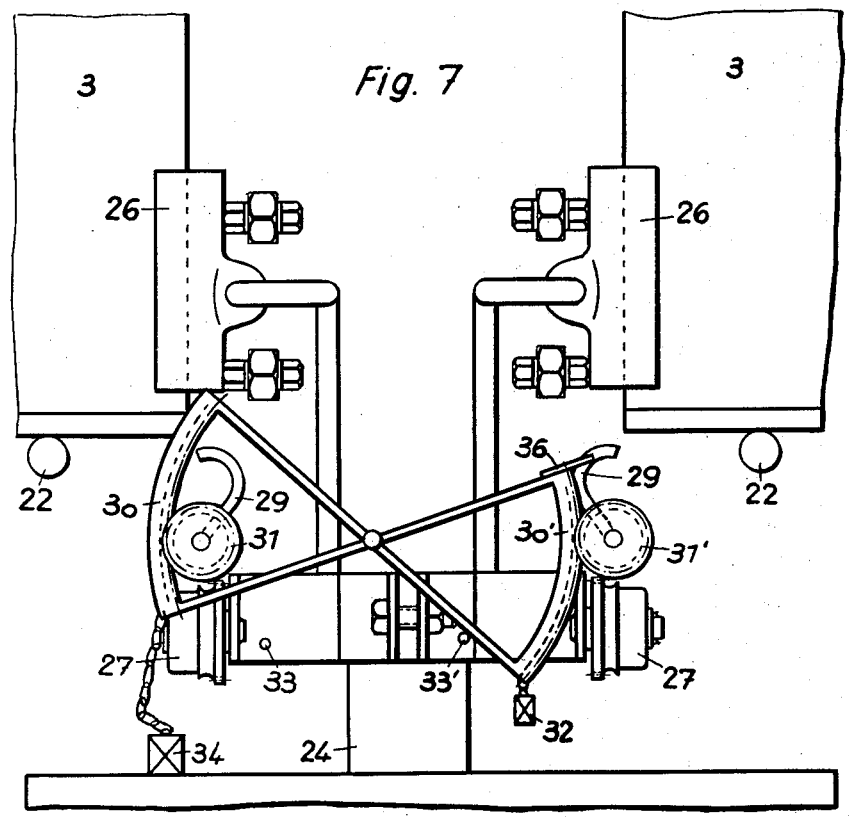

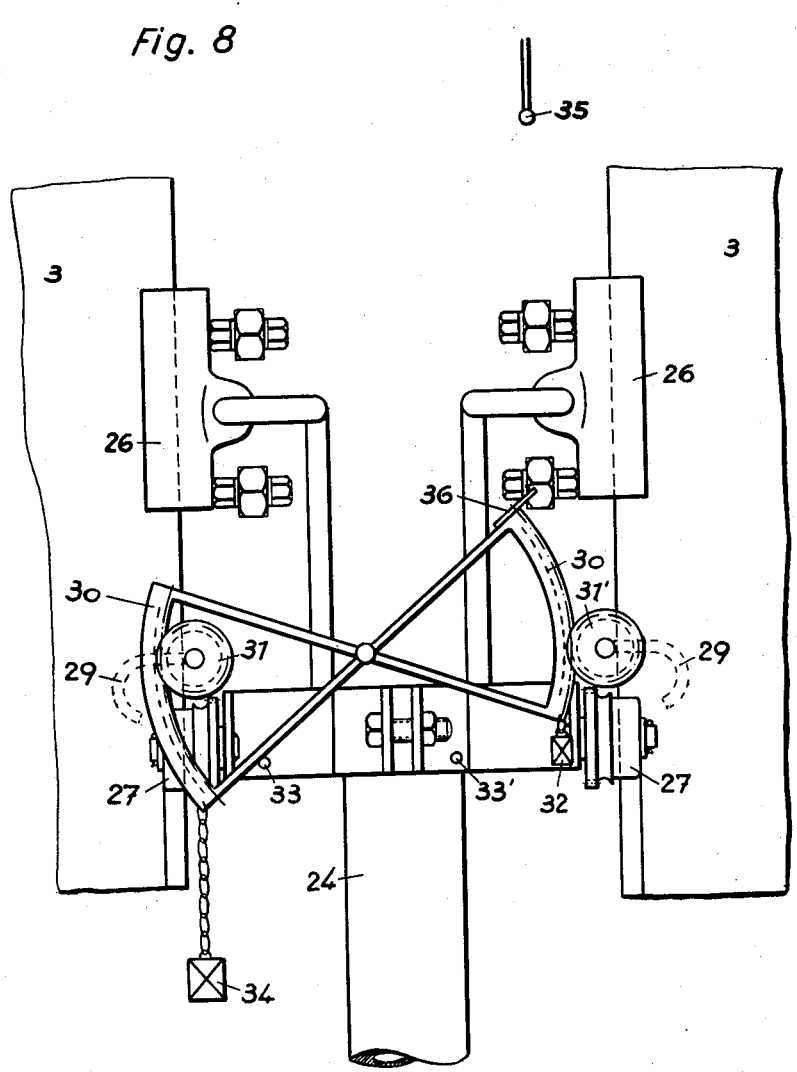

3,103,429
APPARATUS FOR THE PRODUCTION OF WELDED DOUBLE GLASS SHEETS
Fritz Krüger, Franz Mainz, and Günther Rodloff, Witten (Ruhr), Germany, assignors to Libbey-Owens-Ford Glass Company, Toledo, Ohio, a corporation of Ohio
Filed Aug. 6, 1959, Ser. No. 832,057
Claims priority, application Germany Aug. 11, 1958
9 Claims. (Cl. 65—152)

This invention relates to a process and an apparatus for the production of double glass sheets welded together at the edges.

Such double glass sheets are exposed to considerable strain in variations of atmospheric pressure or, for example, when transported over great heights (mountain passes, airplane transportation, etc.) because the pressure of the air in the double glass sheets does not correspond to the pressure of the outside air. Thus, shipments of double glass sheets which were transported by rail over mountain passes have been found to arrive at their destination in a shattered condition.

Welded double glass sheets which are built into railway vehicles and airplanes must, therefore, resist strong changes in pressure. Experience in such cases has shown that the breakage often starts in the welded edge.

It was found that the resistance of the double glass sheets against pressure strains can be considerably improved if the welded edge is rounded off on the inside of the double glass sheet and thereby given an arch-shaped reinforcement.

According to the present invention, in producing double glass sheets in which two individual glass sheets are held at an equal distance from each other and continuously welded together at the edges, a good rounding off of the welded edge is obtained by utilization of an additional burner directed to the inner area of the sheets. This burner is in addition to the burners which heat the glass sheets from the outside during the welding process. In this way, it is possible to obtain a completely even and strain free transition from the welded sheet edge to the two individual sheets of the double glass sheet, and, therefore, to considerably increase the resistance of the sheet to changes in pressure.

The new process can be used with good results in the known process whereby two horizontal sheets of glass are supported one above the other and are welded together at the edges solely by flame action. In this latter process, the operation is as a rule so carried on that a relatively broad edge of the upper horizontally placed, larger sheet, is so widely heated, and so strongly struck by the flame that it bends downward while a relatively narrower edge of the lower and smaller sheet is so heated at the same time that it curls upward whereby the edge portions are united with each other and under burners acting from the outside develop a relatively broad welding area. Through additional heating of the welding area according to the invention, by means of an additional burner arranged between the individual sheets, which functions near the end of the welding process after the sheets have been united by the flames, an improved inner rounding off of the welded edge is provided and a double glass sheet or unit which is particularly resistant to strain is obtained.

The invention can also be used advantageously in the already known process in which the edges of two vertically disposed sheets placed near each other in spaced face-to-face relation are welded together by moving them relative to a welding device in which the edges are first heated and are then worked together by pressure rollers engaging them from the outside. The sheets are in this case first heated in the already known manner by burners acting on their outer sides, and the additional heating of the invention is effected by a burner between the individual sheets either at the same time or shortly after the heated sheet edges are engaged from the outside by the pressure rollers.

It is desirable in this case to attach the additional burner to the pressure roller support means in a furnace where the welding is taking place. The purpose of the additional burner is to bring concentrated heat to the inner surface of the welded edge wall in both of the above described processes such that the result is a good rounding off on the inside of the edge wall along the line of contact of the two sheets. Either electric or gas heated burners can be used for this purpose.

In apparatus for the welding of vertically placed sheets by means of burners and pressure rollers discussed above, a gas burner is placed in the path of movement of the sheets and between the sheet edges. While the sheet margins are being heated from the outside by burners and rollers are acting on the heated margins, this additional burner directs heat onto the place at which the sheet edges are engaged by the pressure rollers on the outside and worked together by these pressure rollers.

According to a further known process, means are provided in the operating area whereby vertical double glass sheets, the upper and lower edges of which have already been welded, are welded along their vertical edges. In this case, the invention provides that the additional burner of the invention is at first disposed outside the sheet edges between the outside burners and the pressure rollers and after the upward travel of the pressure rollers has begun and after they have passed by the welded lower edges is automatically inserted between the individual glass sheets. The additional burner is also automatically withdrawn from between the sheets shortly before it reaches the welded upper edges of the sheets. This device can consist of a segmental rack which engages with a pinion attached to the additional burner and which turns during the upward travel of the outside burners and pressure rollers whereby the additional burner automatically swings into and out of position between the individual sheets.

In the drawings wherein like numerals are employed to designate like parts throughout the same:

FIG. 1 is a longitudinal section through a continuous type furnace for the manufacture of double glass sheets;

FIG. 2 is a transverse section taken along line 2—2 of FIG. 1;

FIG. 3 is a fragmentary elevational view of the glass sheets and supporting means located in front of one of the welding stations;

FIG. 4 is a transverse sectional view taken along line 4—4 of FIG. 3;

FIG. 5 is an elevational view of the welding station for the horizontal edges;

FIG. 6 is a transverse sectional view taken along line 6—6 of FIG. 5;

FIG. 7 is an elevational view of the welding apparatus for the vertical edges of the glass sheets in the rest position;

FIG. 8 is the welding apparatus for the vertical edges of the glass sheets shown in operation; and FIG. 9 is a partial section of a double glass sheet or unit made by the method and with the apparatus of the invention.

The continuous type furnace 1 shown schematically in FIGS. 1 and 2 is supported by vertical members 2 and contains operating stations A, B, C and D to heat and to weld the sheets on the upper and lower edges, and to weld the sheets on both side edges and to subsequently cool the welded sheets.

The glass sheets 3, 4 placed at a distance from each other in face-to-face relation are placed in the furnace in a vertical position. The mechanism for placing the sheets in the furnace and for moving them through the furnace is not shown. A conveyor of the usual type can be used. As they pass through the continuous type furnace 1, the sheets move on guides 5, 6. The guides 5, 6 are preferably so installed that they can be moved nearer together or further apart in order to take sheets of different heights. The displacement of the guides, for example, can be accomplished by changing the position of tie rod 7 for the guides 5, 6.

In the embodiment shown in FIGS. 1 and 2, the double glass sheets are made from two individual sheets of equal size, whereby the welded edge seam is located in the middle of the double glass sheet or unit as shown in FIG. 9.

As best shown in FIGS. 3 and 4, each roller 8, 9 of the roller track and the separator roller 10 between them are seated on a common shaft 11 which is attached by means of a rod 12 to the carrier 13 which passes through the furnace. Guide rollers 14, 14' are provided along the roller track at a distance from each other to engage the sheets on the outer margins thereof. These guide rollers are seated on the carriers 15. When the sheets enter the furnace, the inner and outer portions of the sheets are quickly heated at a different rate so that heat transfers occur in the sheets until the temperature is equalized. It is, therefore, advisable in order to avoid thermal breakage of the sheets, to install the guide rollers 14, 14' located adjacent the entrance end of the furnace so they can swing out laterally and be returned to a normal position, such as by means of a weight.

At the beginning of the operation the door 16 (FIG. 1) of the continuous type furnace 1 is opened, the pair of sheets are set on the roller track and pushed into the preliminary heating zone A. As soon as the sheets have reached the working temperature after the closing of the furnace, they are moved further forward on the roller track into the operating zone B, and thereby pass by, either one after the other or at the same time, the operating areas 17 placed at the upper and lower sheet areas where their upper and lower edges are welded together.

The last roller group 8, 9, 10 is in front of the operating area 17. Looking in the direction of movement of the sheets, it will be noted that there is placed behind this roller group between the sheets a separator rod 18 (FIGS. 5 and 6) which has a hoe shaped extension 19 extending over the welding area, and which prevents the sheets from being pressed together.

As the sheets move through the operating area, a narrow edge portion of the sheets is heated to a sufficiently high temperature from the outside by burner 20 and the heated sheet edges pressed together through the action of the driven pressure rollers 21, 21' (FIGS. 5 and 6) to form a sealed edge wall as in FIG. 9. In this way the upper and lower edges of the glass sheets are fused to one another progressively from one end of the sheets to the other end thereof as they move forwardly.

There is further provided in accordance with the concept of the invention an additional burner 28 (FIG. 5) which is firmly attached to the guide roller track 5 and 6 in the furnace and is introduced into the space between the sheets between the burners 20 which heat the sheet edges from the outside and pressing rollers 21 which work the sheet edges together. The burner 28 directs heat in the direction of the edge portions of the sheets being worked together by the rollers 21, so that inside the sheets a good rounding off is effected along the contact line of the two sheets which are welded together.

After passing the burners 20 and the pressing rollers 21, 21', the sheets, now welded along the upper and lower edges and supported by roller 22, arrive in operating area C where they are welded together along the side edges by a vertically moved welding device 23 (FIG. 1).

The vertically moved welding device is carried on a hollow carrier 24 (FIGS. 7 and 8) which extends through the bottom of the furnace. The carrier 24 consists of a tube which can be moved up and down by a suitable device. The welding device comprises a separator rod, not shown for the sake of giving an over-all view, outside burners 26 and attached pressing rollers 27. The gas feed pipe for the burners can be placed inside the hollow carrier.

FIG. 7 shows the welding device for the vertical edges of the glass sheets in its lower position of rest. The glass sheets 3, 4, whose upper and lower edges have already been welded, are in the operation area C. The additional burner 29 is swung outwards since on account of the welding of the lower sheet edges, it cannot be inserted between the glass sheets. On the welding device there sits a rotatable toothed rack segment 30, 30' that engages with pinions 31, 31' carrying the additional burners 29. The rack segment 30 is in a position of rest and by means of the weight 32 has been drawn down to engage the stop pin 33'.

In FIG. 7, to the left of the rack segment and fastened with a chain there is shown a second weight 34 resting on the furnace floor which is heavier than the weight 32.

FIG. 8 shows the welding device acting on the vertical edges of the glass sheets. As the welding device moves upwardly from its position in FIG. 7 the weight 34 is lifted from the oven floor and because it is heavier than weight 32 it becomes operative so that the rack segment is turned about a horizontal axis and lies on the stop pin 33. When this occurs, the additional burners 29 are swung into operating position between the glass sheets as shown in broken lines in FIG. 8. The vertical sheet edges are now continuously and progressively welded together as they are heated from the outside by burners 26 and then worked together by means of the pressure rollers 27 and at the same time the additional burners 29 heat the glass along the contact line on the inside of the two sheets of glass which are being welded together and rounds off this seam.

There is shown in FIG. 8 of the drawing a movable stop 35 which in reality is much higher and which is heavier than weight 34. This movable stop is placed in the furnace at such a height that a stop surface 36, secured to the rack segment 30', engages it shortly before the additional burners 29 reach the upper sheet edge which has already been welded. The rack segment is by this means pushed down to the stop 33' and swings the additional burners 29 out from between the sheets, so that the sheet edges are completely welded by the further upward movement of the pressure rollers. At the same time the stop surface 36 pushes the movable stop 35 upwardly.

In the above-described embodiments of the invention, two welding devices are shown fastened to the tube-shaped carrier 24. One of these welding devices is pointed towards the entry end of the furnace, and the other is pointed toward the exit end of the furnace (FIG. 1). This arrangement makes it possible to weld at the same time, both the front edge of one double glazing unit and the back edge of a second double glazing unit whose front edge has already been welded in the preceding operation.

It is to be understood that the form of the invention disclosed herein is to be taken as the preferred embodiment thereof and that various changes in size, shape, construction and arrangement of parts may be resorted to without departing from the spirit of the invention or the scope of the following claims.

We claim:

1. Apparatus for producing double glass glazing units, comprising means for carrying a pair of glass sheets supported in spaced face-to-face relation along a definite path, heating means for raising the temperature of the edge portions of the glass sheets to a point at which they can be fused to one another, means disposed along the path of movement of said sheets for engaging the heated edge portions and pressing them together into fusion contact with one another to form a sealed edge wall, and a second heating means also disposed along the path of travel of said sheets for directing heat onto the inner surface of the newly formed edge wall substantially simultaneously with its formation, there being relative movement of said second heating means and said glass sheets with respect to each other to position said second heating means between said glass sheets.

2. Apparatus for producing double glass glazing units as claimed in claim 1, in which said second heating means includes a gas burner disposed between the glass sheets for directing a flame onto the inner surface of the newly formed edge wall.

3. Apparatus for producing double glass glazing units, comprising supporting means for holding a pair of glass sheets in spaced face-to-face relation, conveyor means moving said supporting means along a predetermined path, heating means positioned along said path outwardly of said sheets for heating the edge portions thereof to a temperature at which they can be fused to one another, forming means disposed along said path adjacent said heating means and operable to engage said heated edge portions of said sheets and urge the said portions into fusion contact with one another to form a sealed edge wall, and a second heating means disposed adjacent said forming means and positioned between said sheets for directing heat along the inner line of joinder of the sheet edges forming the edge wall as the latter is formed.

4. Apparatus for producing double glass glazing units as claimed in claim 3, in which said second heating means includes a burner located between the glass sheets for directing a flame along the inner line of joinder of the sheet edges.

5. Apparatus for producing double glass glazing units, comprising means for supporting a pair of glass sheets in vertical spaced face-to-face relation, conveyor means moving the spaced glass sheets intermittently along a predetermined path past a first sealing station and into a second sealing station, heating means disposed along said path at said first station for raising the temperature of the upper and lower horizontal edge portions of the sheets as the latter are moved through said station, forming means disposed along said path and adjacent said heating means for engaging and progressively urging said heated horizontal edge portions into fusion contact with one another to form sealed edge walls, second heating means disposed adjacent said forming means and positioned between said sheets for directing heat along the inner line of joinder of said horizontal edge portions forming said edge walls simultaneously with the fusing together of the edge portions, third heating means disposed at said second station and mounted for substantially vertical movement for directing heat onto the vertical edge portions of said glass sheets after said horizontal edge walls have been formed and while the sheets are at rest in the second station, second forming means disposed adjacent said third heating means for progressively engaging the vertical heated edge portions and urging them into fusion contact with one another to form vertical sealed edge walls, and fourth heating means disposed adjacent said second forming means and relatively movable into a position between said sheets for applying heat along the inner line of joinder of said vertical edge portions forming said edge walls simultaneously with the fusing together of the edge portions.

6. Apparatus for producing double glass glazing units as claimed in claim 5, in which means are provided for swinging said fourth heating means into position between the glass sheets during the vertical edge forming operation and away from said glass sheets shortly before the conclusion thereof.

7. Apparatus for producing double glass glazing units as claimed in claim 5, in which the means for heating the vertical edge portions, the means for urging the heated vertical edge portions into fusion contact and the said last named heating means are carried by a conveying means which moves them as a unit.

8. Apparatus for producing double glass glazing units, which comprises a furnace, a support for holding a pair of glass sheets in substantially vertical face-to-face spaced relationship, a conveyor for intermittently carrying the spaced glass sheets through said furnace along a definite horizontal path, heating means disposed along the path of movement of said sheets for directing flames from the outside onto the upper and lower horizontal edge portions of the glass sheets, pressure rollers for progressively urging the heated horizontal edge portions together into fusion contact with one another to form sealed edge walls, second heating means positioned between said glass sheets for directing heat onto the inner surfaces of said newly formed horizontal edge walls, a second conveyor intermittently moving along a substantially vertical path in alternating sequence with said first conveyor, third heating means carried by said second conveyor for heating the vertical edge portions of said glass sheets as it moves therealong, pressure rollers carried by said second conveyor for urging the heated vertical edge portions of said glass sheets into fusion contact with one another to form vertical sealed edge walls, and fourth heating means carried by said second conveyor and relatively movable into a position between said sheets for heating the inner surfaces of said vertical edge walls as they are formed.

9. Apparatus for producing double glass glazing units as claimed in claim 8, in which said fourth heating means comprises burners, and means are provided for moving said burners into position between the glass sheets closely adjacent the lower sealed edge wall and away from said glass sheets in advance of but closely adjacent the upper sealed edge wall.

References Cited in the file of this patent

UNITED STATES PATENTS

| | | |
|---|---|---|
| 1,912,405 | Ronci | June 6, 1933 |
| 2,116,297 | Aurien | May 3, 1938 |
| 2,648,166 | Fisher et al. | Aug. 11, 1953 |
| 2,968,125 | Crowley et al. | Jan. 17, 1961 |

FOREIGN PATENTS

| | | |
|---|---|---|
| 203,179 | Australia | Aug. 15, 1956 |
| 1,157,357 | France | Dec. 30, 1957 |
| 790,234 | Great Britain | Feb. 5, 1958 |